US00RE40892E

(19) United States
(12) Reissued Patent
Iida

(10) Patent Number: US RE40,892 E
(45) Date of Reissued Patent: Sep. 1, 2009

(54) NETWORK FACSIMILE APPARATUS

(75) Inventor: Junichi Iida, Fukuoka (JP)

(73) Assignee: Panasonic Communications Co., Ltd., Fukuoka (JP)

(21) Appl. No.: 11/651,087

(22) Filed: Jan. 9, 2007

Related U.S. Patent Documents

Reissue of:
(64) Patent No.: 6,900,903
Issued: May 31, 2005
Appl. No.: 09/314,957
Filed: May 20, 1999

(30) Foreign Application Priority Data

Sep. 29, 1998 (JP) ..... 10-274920

(51) Int. Cl.
*G06F 15/00* (2006.01)

(52) U.S. Cl. ..... 358/1.15; 358/402; 358/403; 709/206; 709/239; 379/100.01; 379/100.08; 379/100.12; 379/100.13; 379/100.09

(58) Field of Classification Search ..... 358/1.15, 358/402, 403; 709/206, 239; 379/100.01–100.15
See application file for complete search history.

(56) References Cited

U.S. PATENT DOCUMENTS

| | | | |
|---|---|---|---|
| 5,386,297 | A | 1/1995 | Tanaka et al. |
| 5,396,341 | A | 3/1995 | Takahashi et al. |
| 5,530,852 | A | 6/1996 | Meske, Jr. et al. |
| 5,548,789 | A | 8/1996 | Nakanura |
| 5,555,100 | A | 9/1996 | Bloomfield et al. |
| 5,608,786 | A | 3/1997 | Gordon |
| 5,675,507 | A | 10/1997 | Bobo, II |
| 5,684,607 | A | 11/1997 | Matsumoto |

(Continued)

FOREIGN PATENT DOCUMENTS

| | | |
|---|---|---|
| DE | 19704694 | 8/1997 |
| EP | 0615377 | 9/1994 |
| EP | 0801492 | 10/1997 |
| EP | 835011 A1 | 4/1998 |
| EP | 0835011 | 4/1998 |
| EP | 0845994 | 6/1998 |
| EP | 0867817 | 9/1998 |
| EP | 0887994 | 12/1998 |
| JP | 3-289756 | 12/1991 |

(Continued)

OTHER PUBLICATIONS

English Language Abstract of JP 9–214560.
English Language Abstract of JP 9–258764.
English Language Abstract of JP 10–178488.
English Language Abstract of JP 10–326288.
English Language Abstract of JP 10–288428.
English Language Abstract of JP 6–035915.
English Language Abstract of JP 09–231022.
English Language Abstract of JP 10–65853.

(Continued)

*Primary Examiner*—Edward L Coles
*Assistant Examiner*—Chan S Park
(74) *Attorney, Agent, or Firm*—Greenblum & Bernstein, P.L.C.

(57) ABSTRACT

The network facsimile apparatus is able to communicate using both a public switched telephone network and a computer network, and has a facsimile section which transmits and receives an image via the public switched telephone network, a network communication section which transmits and receives data via the computer network, a storage which is to store received data and a structured document, a web server which transmits received data or a structured document to the computer network, and a reception list generating section which generates a structured document of reception list indicative of document information of received data.

37 Claims, 11 Drawing Sheets

U.S. PATENT DOCUMENTS

| | | | |
|---|---|---|---|
| 5,720,014 | A | 2/1998 | Ikeda et al. |
| 5,781,901 | A | 7/1998 | Kuzma |
| 5,790,548 | A | 8/1998 | Sistanizadeh et al. |
| 5,790,793 | A | 8/1998 | Higley |
| 5,805,298 | A | 9/1998 | Ho et al. |
| 5,848,137 | A | 12/1998 | Hsiao |
| 5,870,549 | A | 2/1999 | Bobo, II |
| 5,881,233 | A | 3/1999 | Toyoda et al. |
| 5,956,487 | A | 9/1999 | Venkatraman et al. |
| 6,101,526 | A | 8/2000 | Mochizuki |
| 6,134,017 | A | 10/2000 | Schlank et al. |
| 6,170,007 | B1 | 1/2001 | Venkatraman et al. |
| 6,181,781 | B1 | 1/2001 | Porter et al. |
| 6,208,426 | B1 | 3/2001 | Saito et al. |
| 6,209,048 | B1 | 3/2001 | Wolff |
| 6,230,189 | B1 | 5/2001 | Sato et al. |
| 6,396,848 | B1 | 5/2002 | Ohta |
| 6,983,415 | B2 | 1/2006 | Shima |
| 2005/0278412 | A1 | 12/2005 | Iida |

FOREIGN PATENT DOCUMENTS

| | | |
|---|---|---|
| JP | 4-235434 | 8/1992 |
| JP | 5-14580 | 1/1993 |
| JP | 5-014580 | 1/1993 |
| JP | 5-347677 | 12/1993 |
| JP | 6-035915 | 2/1994 |
| JP | 8-223346 | 8/1996 |
| JP | 8-305520 | 11/1996 |
| JP | 8-307702 | 11/1996 |
| JP | 8-339274 | 12/1996 |
| JP | 9-163064 | 6/1997 |
| JP | 9-214560 | 8/1997 |
| JP | 9-223096 | 8/1997 |
| JP | 9-231022 | 9/1997 |
| JP | 09-231022 | 9/1997 |
| JP | 9-233243 | 9/1997 |
| JP | 9-258764 | 10/1997 |
| JP | 9-331416 | 12/1997 |
| JP | 10-65853 | 3/1998 |
| JP | 10-063590 | 3/1998 |
| JP | 10-065853 | 3/1998 |
| JP | 10107836 | 4/1998 |
| JP | 10-107836 | 4/1998 |
| JP | 10-149270 | 6/1998 |
| JP | 10-150462 | 6/1998 |
| JP | 10150462 | 6/1998 |
| JP | 10173890 | 6/1998 |
| JP | 10-173890 | 6/1998 |
| JP | 10-178488 | 6/1998 |
| JP | 10-191010 | 7/1998 |
| JP | 10191010 | 7/1998 |
| JP | 10191463 | 7/1998 |
| JP | 10-191463 | 7/1998 |
| JP | 10-288428 | 8/1998 |
| JP | 10-326288 | 8/1998 |
| JP | 10233879 | 9/1998 |
| JP | 10-233879 | 9/1998 |
| JP | 10247179 | 9/1998 |
| JP | 10-247179 | 9/1998 |
| JP | 10-511792 | 10/1998 |
| JP | 11-196214 | 7/1999 |
| JP | 11196214 | 7/1999 |
| JP | 7-212395 | 8/1999 |
| WO | WO-97/10668 A1 | 3/1997 |
| WO | 97/10668 | 3/1997 |
| WO | 97/096682 | 3/1997 |
| WO | 97/22203 | 6/1997 |
| WO | 97/38510 | 10/1997 |
| WO | 98/23058 | 5/1998 |
| WO | 98/28892 | 7/1998 |

OTHER PUBLICATIONS

"Web Programming Secrets with HTML, CGI, Perl," Chapter 11 (A CGI–Based Fax Viewer) published by BNN Inc., pp. 329–355.

Tittel et al., "Web Programming Secrets with HTML, CG1, and Perl," Chapters 1 and 11 (The Common Gateway Interface and the Basics of CG1 Programming), published by IDG Books Worldwide, Inc., 1996, pp. 3–42 and 329–355.

Bach, "The Design of the UNIX Operating System," Chapter 4 (Internal Representation of Files), Published by Prentice–Hall, Inc., 1986, pp. 60–88.

English Language Abstract of JP 10–191010.

English Language Abstract of JP 10–191463.

English Language Abstract of JP 10–233879.

English Language Abstract of JP 10–247179.

English Language Abstract of JP 11–196214.

"The Secret of Web Programming by HTML, GCI, PERL" issued by BNN, pp. 293–316.

Saito et al. "Development of Internet Electronic Facsimile System" NTT Technical Journal, vol. 9, No. 5, May 1, 1997, pp. 94–97, together with an English language translation of the same.

Y. Saito "Trends and Aims of Internet FAX from Information Distribution", NTT Technical Journal, vol. 10, No. 7, Jul. 1, 1998, pp. 33–35, together with an English language translation of the same.

"Secrets in Web Programming with HTML, CGI, Perl," published by BNN Inc., pp. 294–295, 303–306, 309–310 and 315–316, along with an English language translation of the relevant portion.

English Language Abstract of JP 4–235434.

English Language Abstract of JP 5–01480.

English Language Abstract of JP 5–347677.

English Language Abstract of JP 8–223346.

English Language Abstract of JP 8–305520.

English Language Abstract of JP 8–307702.

English Language Abstract of JP 8–339274.

English Language Abstract of JP 9–163064.

English Language Abstract of JP 9–231022.

English Language Abstract of JP 9–233243.

English Language Abstract of JP 9–331416.

English Language Abstract of JP 10–065853.

English Language Abstract of JP 10–107836.

English Language Abstract of JP 10–149270.

English Language Abstract of JP 10–150462.

English Language Abstract of JP 10–173890.

English Language Abstract of JP 3–289756.

English Language Abstract of JP 339274.*

* cited by examiner

FIG. 7

| DOCUMENT NUMBER | DOCUMENT FILE NAME | REGISTERED DATE | SENDER | TITLE |
|---|---|---|---|---|
| 0001 | FAX0001. TIF | 1998. 08. 03 14:45:31 | 03−1234−5678 | G3FAX RECEIVED DOCUMENT |
| 0002 | MAIL0001. TIF | 1998. 08. 05 11:30:15 | IFAX@abc. co. jp | MAP |
| 0003 | AUDIO0001. TIF | 1998. 08. 13 19:15:20 | 03−7789−1122 | TELEPHONE SPEECH |

NETWORK FACSIMILE APPARATUS

Matter enclosed in heavy brackets [ ] appears in the original patent but forms no part of this reissue specification; matter printed in italics indicates the additions made by reissue.

*The present application is a reissue application which is related to U.S. application Ser. No. 09/314,957, filed on May 20, 1999, now U.S. Pat. No. 6,900,903, issued May 31, 2005.*

BACKGROUND OF THE INVENTION

1. Field of the Invention

The present invention relates to a network facsimile apparatus capable of performing transmission and reception of facsimile data and e-mail data connecting to a PSTN and a network such as the Internet or LAN.

2. Description of the Related Art

Recently, it has been performed to connect a personal computer, work station, FAX server or the like to a network in order to transmit and receive an e-mail and facsimile and to browse homepages.

FIG. 1 illustrates a system structure of the case of performing facsimile transmission and reception using a FAX server. The reception operation at a client machine (personal computer) will be described next. FAX modem 1001 receives a call from the PSTN (Public Switched Telephone Network) and fetches image data to transmit to FAX server 1002. FAX server software operating at FAX server 1002 receives the image data, and stores the image data as an image data file at file server 1003 through the network. At this point, the storage of facsimile received data is finished.

To fetch the received image data into client machine 1004, a user starts a dedicated application at client machine 1004 and reads out the image data from file server 1003 through the network.

Further, a method of reusing facsimile received data by combining an Internet FAX and a WWW server has been recently proposed. The method utilizes the function of the internet FAX which converts data received from the PSTN into an e-mail.

FIG. 2 illustrates a system structure of the case of performing facsimile transmission and reception using an internet FAX and a WWW server. The reception operation at the client machine will be described.

Image data received at internet FAX 1101 via the PSTN is converted into an attached file format to an e-mail at internet FAX 1101 and is transmitted to WWW server 1103 as an attached file of e-mail.

The e-mail with the attached file transferred from internet FAX 1101 is received at e-mail server 1102 via a network. The e-mail with the attached file received at e-mail server 1102 is transferred to WWW server 1103 that is a destination again via the network.

WWW server 1103 stores the attached file of e-mail as image data to link to a homepage for facsimile reception. The storage of facsimile received data is finished at this point.

In order to fetch received data into client machine 1104, a user starts a WWW browser at client machine 1104 and accesses to the homepage for facsimile reception at WWW server 1103. The user reads out an image data file at client machine 1104 via the network from WWW server 1103.

However, in the system using the above described FAX server, since image data is transferred two times through a network, i.e., from the FAX server to the file server and further from the file server to the client machine until the client machine receives facsimile received data, there is a problem that network traffic is increased.

Further, there is another problem that the system requires cost for a dedicated application which is needed to transmit and receive facsimile data at a file server for storing facsimile received data and a client machine.

In addition, in the conventional system using the above-described FAX server and WWW server, since image data is transferred three time through a network, i.e., from the internet FAX to the e-mail server, further from the e-mall server to the WWW server, and furthermore from the WWW server to the client machine until the client machine receives facsimile received data, and image data attached to e-mail has a data capacity approximately 1.3 times that of binary data, there is a problem that the network traffic is further increased.

Further, there is another problem that the system requires cost for a workstation as a WWW server and a dedicated application which is needed to open received data as a homepage.

SUMMARY OF THE INVENTION

An object of the present invention is to provide a network facsimile apparatus which is able to decrease network traffic caused by data transmission.

Another object of the present invention is to provide a network facsimile apparatus which is able to transmit and receive image data through a network with an inexpensive configuration without requiring dedicated hardware and software.

The network facsimile apparatus of the present invention has a facsimile section which transmits and receives an image via the PSTN, a network communication section which transmits and receives data via a computer network, a storage having a storage area at which received data including an image received at the facsimile section and the data received at the network communication section are stored and another storage area at which a structured document is stored, and a web server which transmits the received data or the structured document stored in the storage to the computer network.

According to the present invention, the network facsimile apparatus is able to issue a homepage of the apparatus own toward outside, which enables the network facsimile to communicate information including image data with an external terminal using the home page. Further, since the present invention enables the network facsimile connected to the network to have a WWW server function, it is possible to use the internet inexpensively with a plain configuration without requiring a dedicated terminal for operating server software.

In addition, the network facsimile apparatus of the present invention has a reception list generating section which generates a structured document of reception list indicative of document information of the received data stored in the storage, and the web server transmits the structured document of reception list to the client via the computer network in response to a request from the client.

According to the above configuration, since it is possible to obtain data received and stored at the network facsimile apparatus using WWW browser software at a network client, it is thereby possible for a user of a personal computer who does not have a facsimile apparatus to receive facsimile image data using the existing software.

In addition, the network facsimile apparatus of the present invention holds stored file information which is generated in document structure markup language such as HTML, transmits the file information to a terminal which accesses to the apparatus with a URL address, and transmits or prints a predetermined file or transmits the file to another terminal when receives an instruction from the terminal.

According to the above processing, it is possible for a network client to easily reuse data once stored. For example, it is possible for a user of a personal computer who does not have a facsimile apparatus to transmit facsimile image data using the existing software.

In addition, the network facsimile apparatus of the present invention transmits data, which is transmitted from the terminal connected to the network facsimile apparatus by a network, to another terminal by facsimile.

According to the above processing, it is possible to directly transmit data, which the network client manages, by facsimile.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 7 is a diagram illustrating a content of FAX reception list at the network facsimile apparatus according to the above embodiment;

DETAILED DESCRIPTION OF THE PREFERRED EMBODIMENT

The embodiment of the present invention will be described below in detail with reference to drawings.

Figure 1:
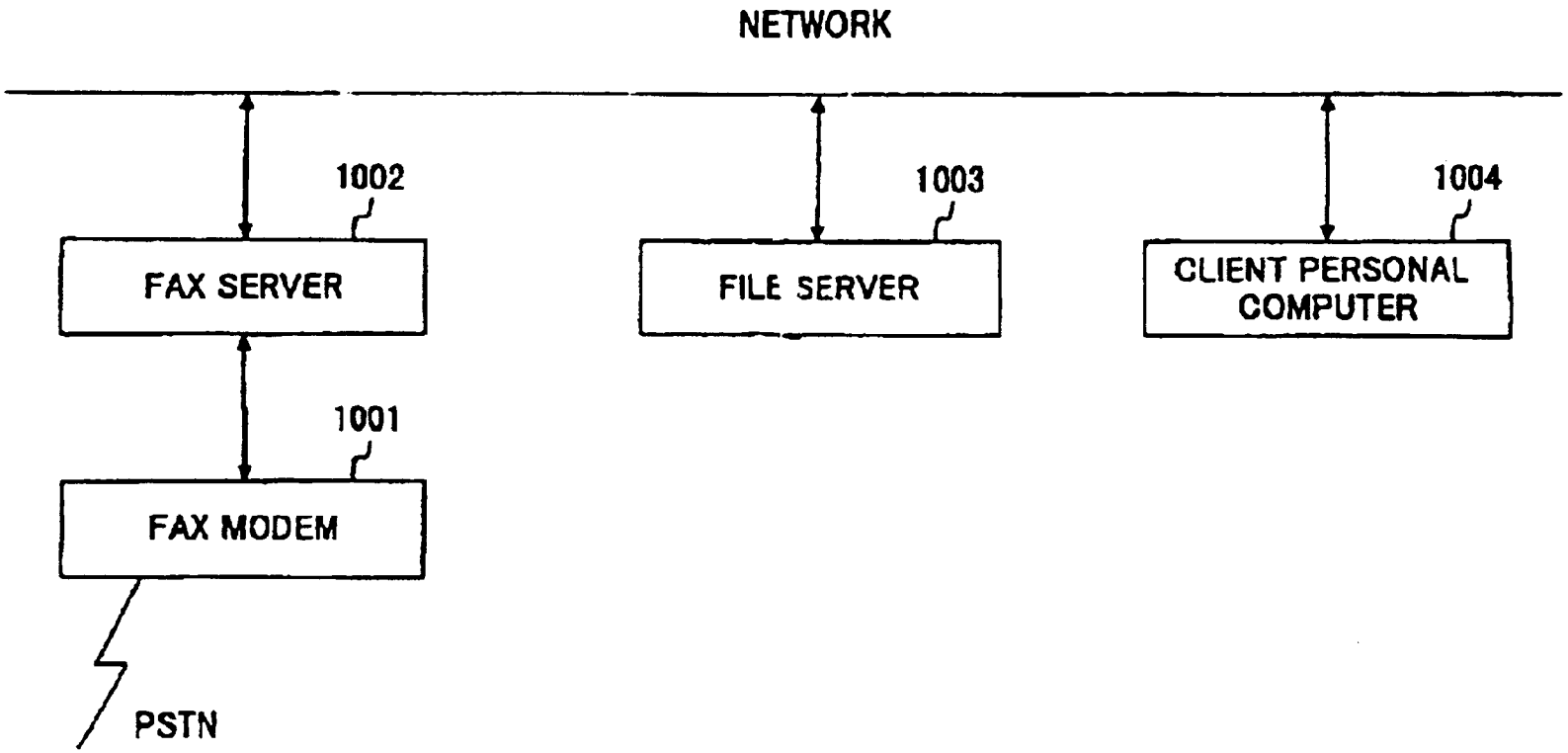
FIG.1 PRIOR ART
FIG. 1 is a configuration diagram of a system using a conventional FAX server.
Figure 2:
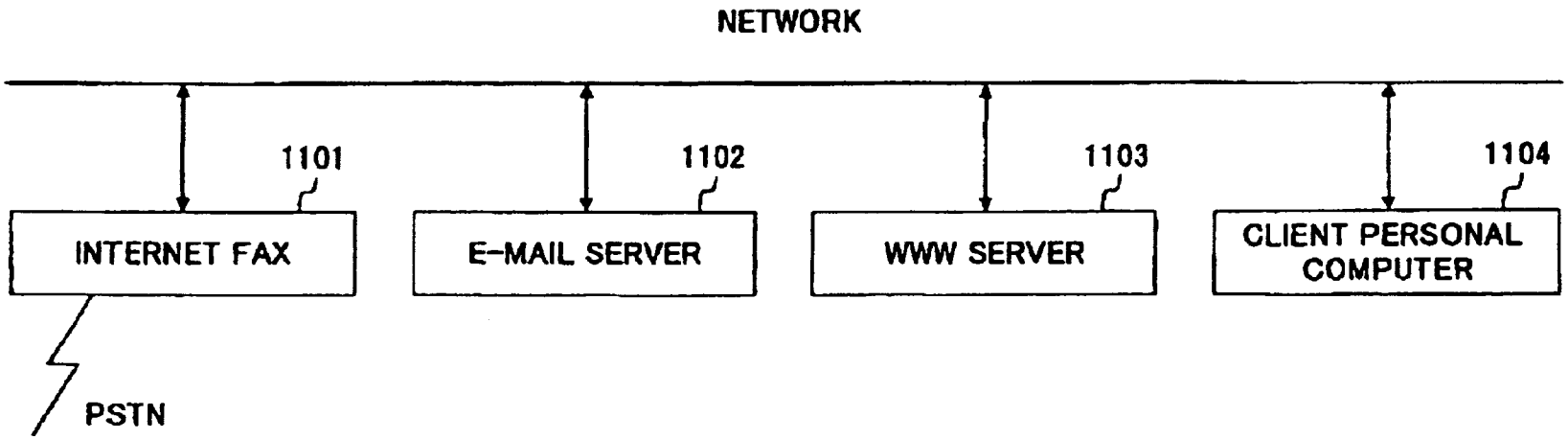
FIG.2 PRIOR ART
FIG. 2 is a configuration diagram of a system using a conventional internet FAX and WWW server.
Figure 3:
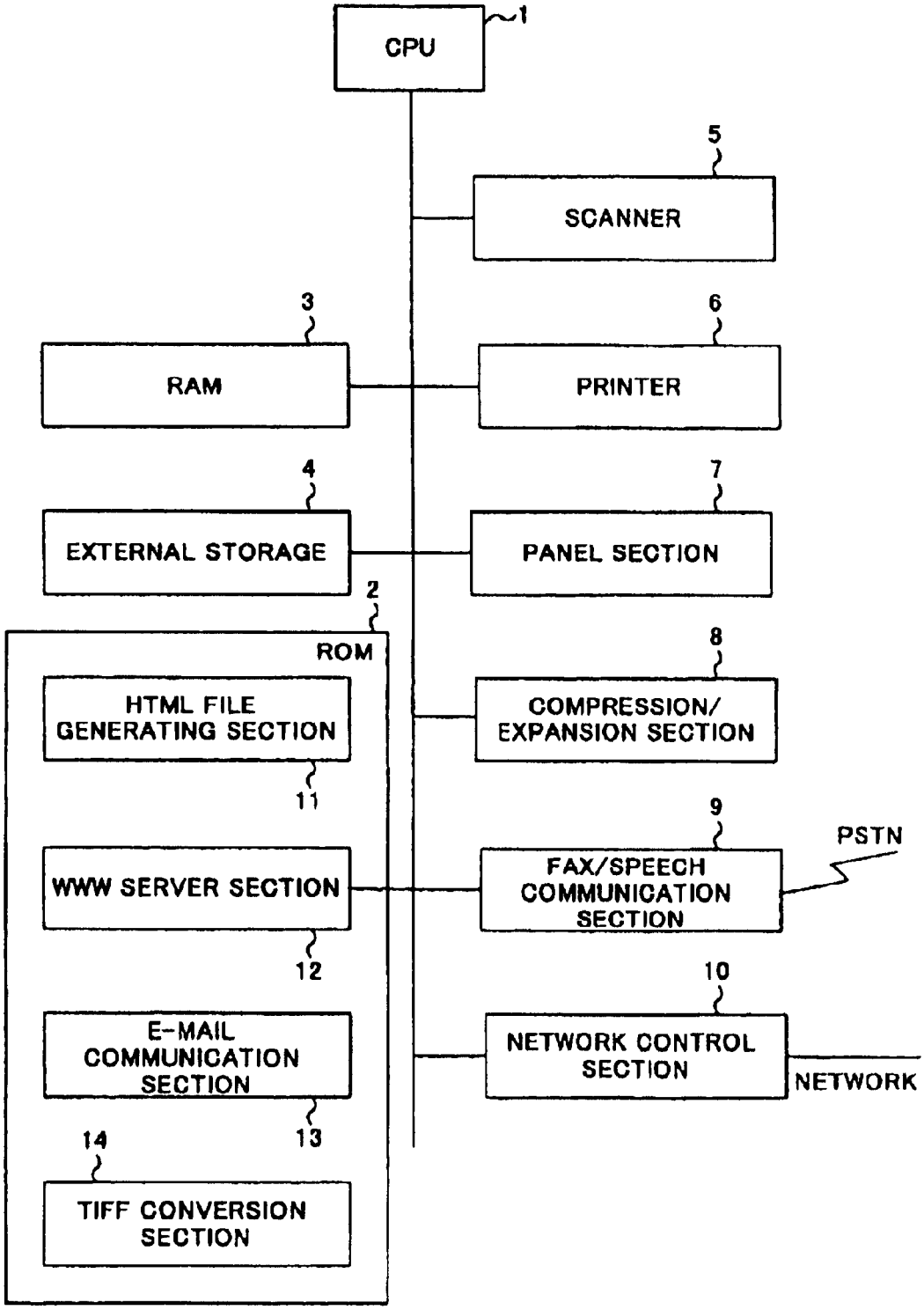
FIG. 3 is a schematic block diagram illustrating a configuration of a network facsimile apparatus according to an embodiment of the present invention.

FIG. 3 illustrates a schematic block diagram of a network facsimile apparatus according to an embodiment of the present invention. In FIG. 3, CPU 1 controls over the entire apparatus. ROM 2 is a read only memory to store programs, in which each program for HTML file generating section 11, WWW server section 12, e-mail communication section 13 and TIFF conversion section 14 is stored. RAM 3 is a memory used for data of programs stored in ROM 2. RAM 3 is also used to store e-mail software with the software e-mail address held and URL addresses. External storage 4 is a storage such as a hard disk and used to store compressed image data and HTML files. Scanner 5 scans image data of, for example, an original. Printer 6 performs printing of received image data or scanned imaged data. A user is able to perform operations such as an instruction to scan image data and an enter of destination address using panel section 7. Compression/expansion section 8 performs expansion of received image data and compression of scanned image data. FAX/speech communication section 9 performs facsimile communication and speech communication connecting to a PSTN. Network control section 10 performs the internet communication connecting to a network. HTML file generating section 11 generates, for example, a list of received image data as a HTML file which is readable on a homepage. WWW server section 12 performs communications with WWW browser software in accordance with HTTP protocol to exchange homepage data (HTML files). E-mail communication section 13 performs transmission and reception of e-mail via a network, while functions as an e-mail server. TIFF conversion section 14 converts coded facsimile data and document file data into TIFF format.

Figure 4:
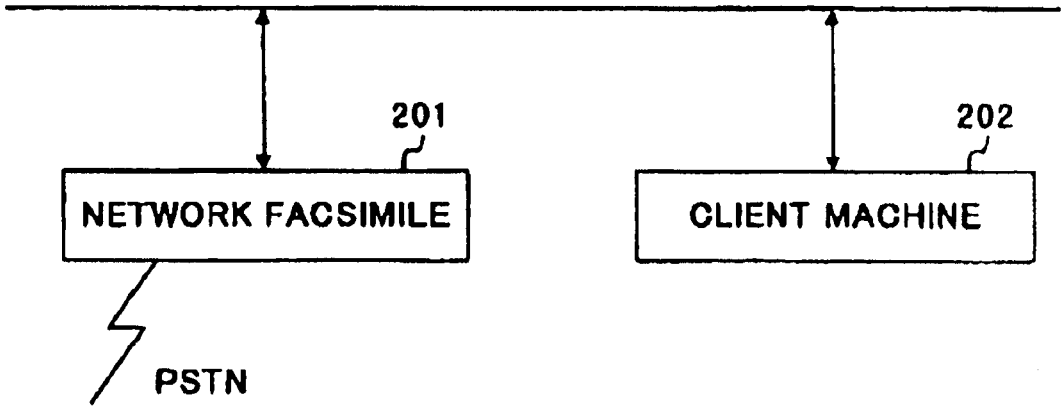
FIG. 4 is a configuration diagram of a network system using the network facsimile apparatus according to the above embodiment.

FIG. 4 is a diagram illustrating a system configuration in the case of using a network facsimile apparatus according to the embodiment of the present invention. In FIG. 4, network facsimile apparatus 201 is connected to the PSTN, while has a network interface. Network facsimile apparatus also has the WWW server section and the e-mail communication section as illustrated in FIG. 3. Client machine 202 operates a WWW browser to browse a homepage.

Figure 5:
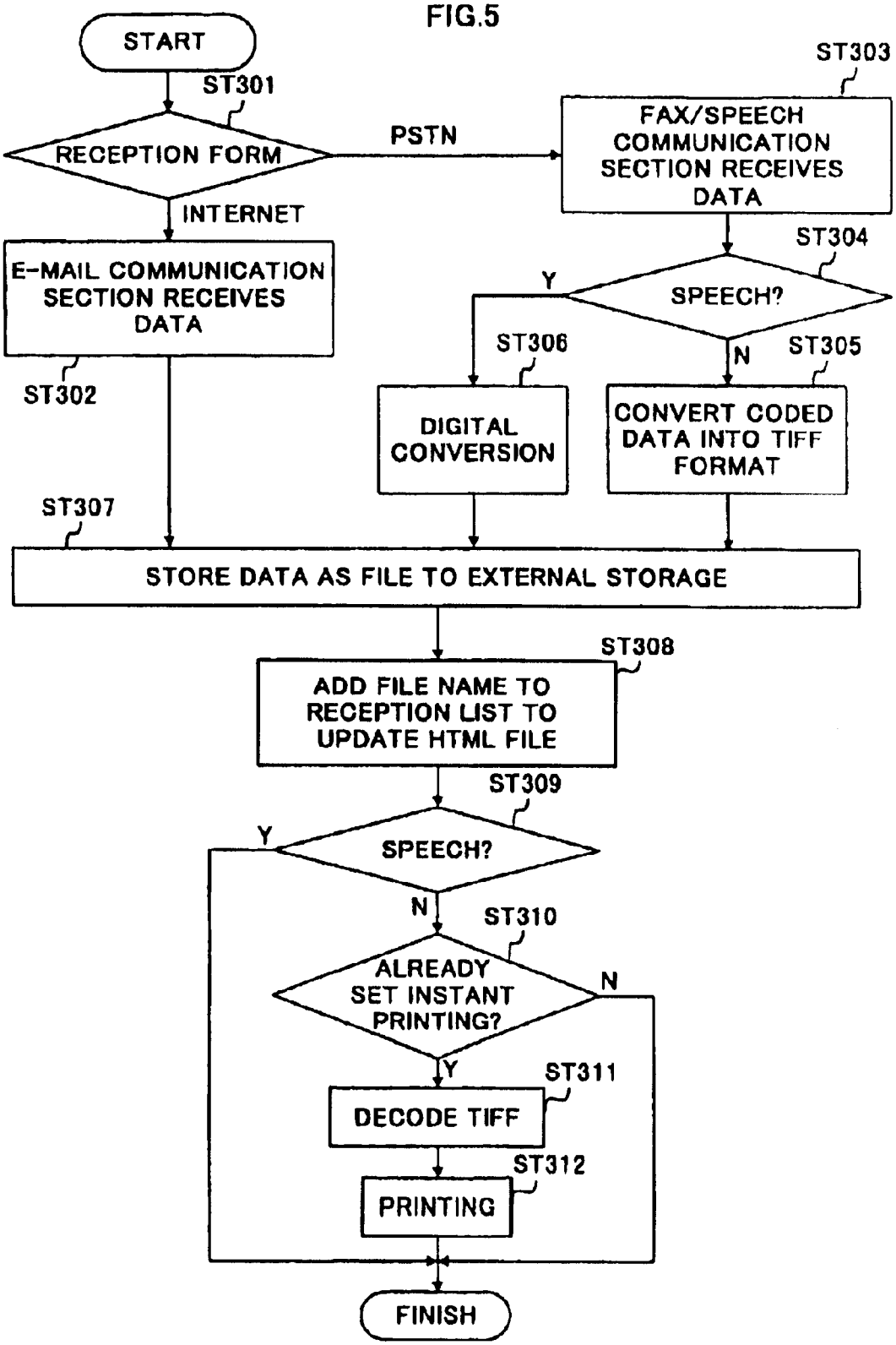
FIG. 5 is a flowchart to explain a reception operation at the network facsimile apparatus according to the above embodiment.

The reception operation of the network facsimile apparatus configured as described above will be described according to a flowchart in FIG. 5.

At step (hereinafter abbreviated as ST) 301, it is decided whether the reception is performed via the PSTN or the internet. At ST302 to ST307, when the reception is performed via the internet, e-mail communication section 13 receives the e-mail. When attached data is image data in TIFF (Tag Images File Format) that is a standard format for an image file, e-mail communication section 13 stores the image data at external storage 4 providing a file name such as, for example, "mail0001.tif". When attached data is speech data, e-mail communication section 13 stores the speech data at external storage 4 providing a file name such as, for example, "audio0001.wav". When the reception is performed via the PSTN, FAX/speech communication section 9 receives imaged data or speech data. When the received data is image data, FAX/speech communication section 9 requests TIFF conversion section 14 to convert the coded data into TIFF format. FAX/speech communication section 9 provides a file name such as, for example, "fax0001.tif" to the TIFF-converted received data to store at external storage 4. When the received data is speech data, FAX/speech communication section 9 converts the speech data into the digital data and provides a file name to the speech data to store an external storage 4. In addition, it is possible to talk with a receiver after buzzing at the network facsimile apparatus depending on the setting.

HTML file generating section 11 manages a reception list table, illustrated in FIG. 7, stored in external storage 4. At ST308, when HTML file generating section 11 receives a file name, which is provided to the received data, from FAX/speech communication section 9 or e-mail communication section 13, HTML file generating section 11 adds the file name to the reception list. In addition, at this stage, a document number that is provided in order of storing, a title of e-mail notified from e-mail communication section 13 (in the case of facsimile reception, a fixed character sequence such as "G3FAX received document), data registered to the reception list table, and sender name are also stored. HTML file generating section 11 next updates a HTML file used in displaying the reception list on the browser, based on the updated reception list table. Specifically, HTML file generating section 11 reads the HTML file that is prepared in advance to display a FAX reception list page illustrated by 602 in FIG. 8 and writes a character sequence indicative of, for example, document number that is newly stored management data in the reception list table illustrated in FIG. 7 in order to edit. "0001" that is a character sequence of the edited document number is tagged with <A HREF= "fax0001.tif">, thereby the character sequence "0001"is linked to a file of fax0001.tif that is the received file.

At ST309, when received data is speech data, the processing is finished.

The network facsimile apparatus is able to set printer 6 to print the received image data instantly after the received image data is stored in external storage 4.

At ST310, it is judged whether or not the setting is the instant printing. When the setting is not the instant printing, the reception operation is finished. When the setting is the instant printing, at ST311 to ST312, compression/expansion section 8 decompresses the image data stored in TIFF format at external storage 4 to output to printer 6. Printer 6 prints the decompressed data.

Figure 6:
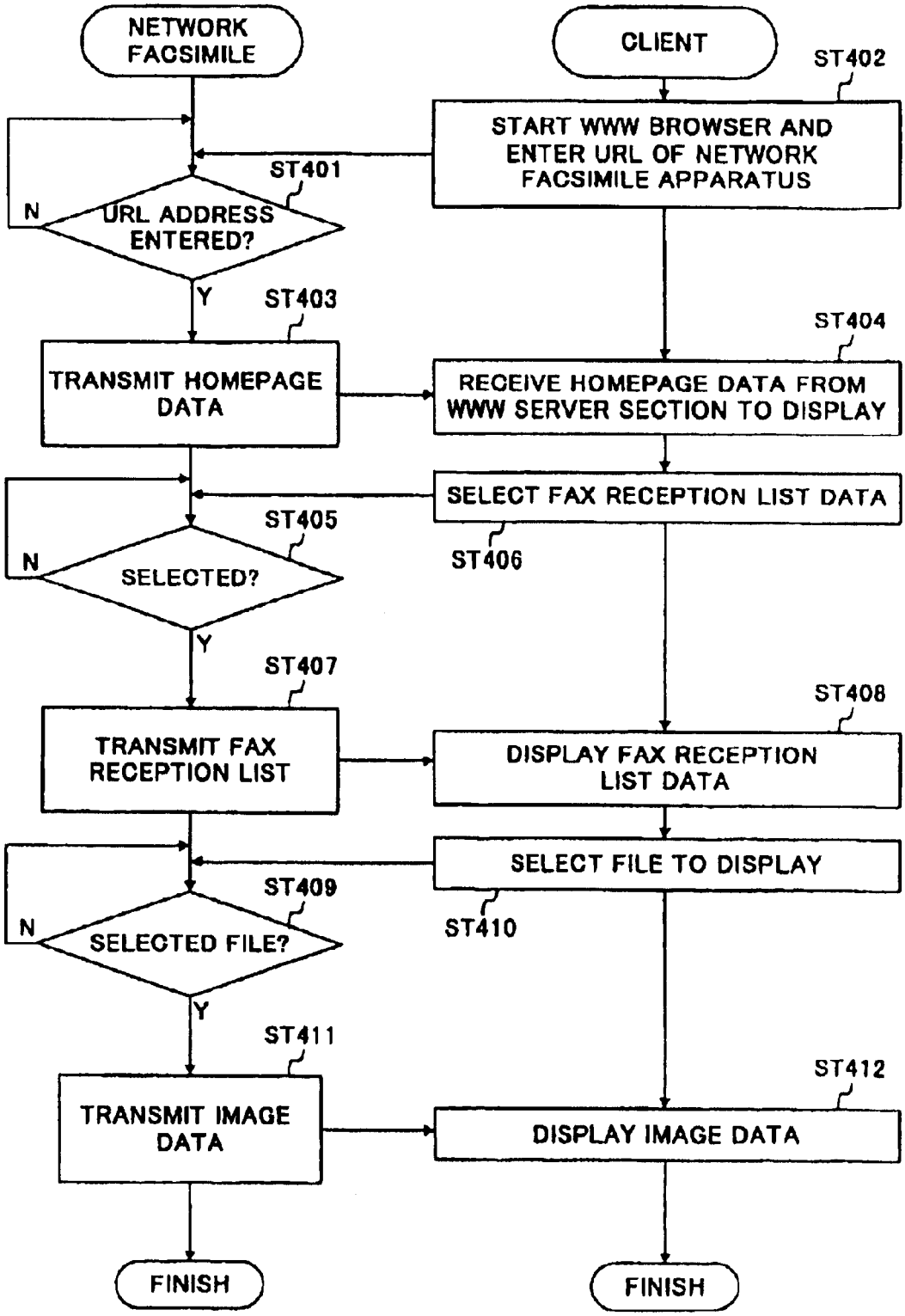
FIG. 6 is a flowchart to explain an operation for transmitting data stored at the network facsimile apparatus according to the above embodiment to a client machine.

The operation of transmitting data received and stored at the network facsimile apparatus to a client machine will be described next according to a flowchart in FIG. 6. At ST401, the network facsimile apparatus is in a stand-by state until a homepage address (URL address) is entered. At ST402, the client machine connected to a network starts a WWW browser (homepage browsing software) and enters the URL address of the network facsimile apparatus to access the homepage. In the accessed network facsimile apparatus, at ST403, WWW server section 12 initiates the processing through network control section 10, and transmits homepage data (HTML file) stored in external storage to the WWW browser of the client machine. According to the aforementioned processing, at ST404, the homepage of the network facsimile is displayed at the client machine, for example, as illustrated by 601 in FIG. 8. The network facsimile apparatus awaits at ST405 until next selection is performed.

Figure 8:
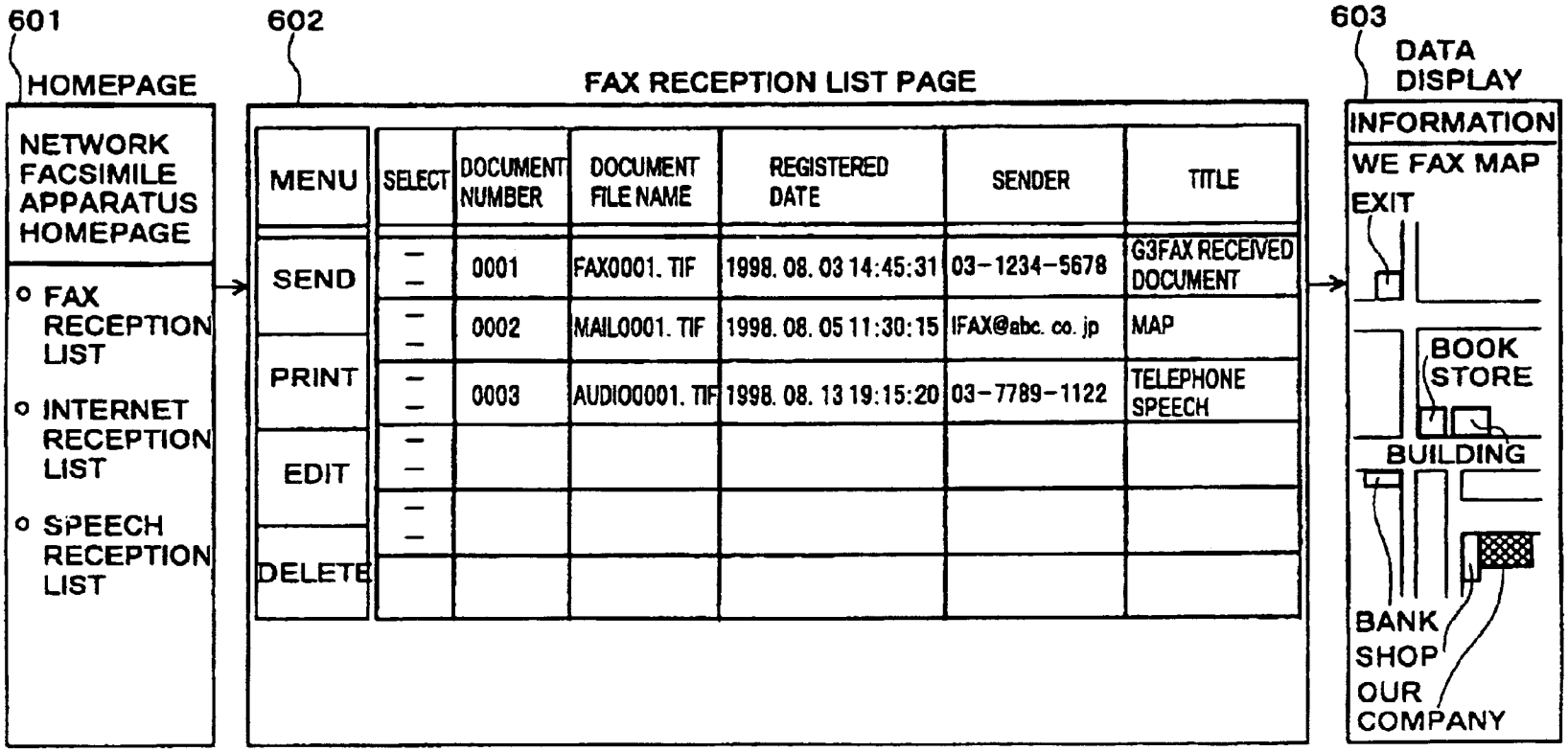
FIG. 8 is a diagram illustrating a content of a homepage at the network facsimile apparatus according to the above embodiment

At ST406 to ST408, when a user selects "FAX reception list" among from displayed data, the network facsimile apparatus transmits the HTML file on FAX reception list linked to the character sequence of "FAX reception list" to the client machine, and the FAX reception list is thereby displayed on the WWW browser at the client machine as illustrated by 602 in FIG. 8. The network facsimile apparatus awaits at ST409 until next selection is performed.

At ST410 to ST412, when a user selects a file to display among from the FAX reception list, the network facsimile apparatus transmits an image data file. The image data (for example, file0001.tif) is displayed on the WWW browser at the client machine using the helper application to display the TIFF file as illustrated by 603 in FIG. 8.

The aforementioned example describes about the case of displaying FAX received data. However, when a speech file is selected, the speech data linked to the speech file is played back at a speaker of the client machine. The speech data includes speech data that the user records at a receiver of the network facsimile apparatus besides the speech data received from outside, and it is possible to link these speech data to the homepage and also to transmit toward outside.

The next description illustrates the operation in the case where the WWW browser at the client machine performs transmission of the network facsimile apparatus. As the transmission operation, there are two cases of transmitting data stored at the network facsimile apparatus and of transmitting a document file at the client machine.

Figure 9:
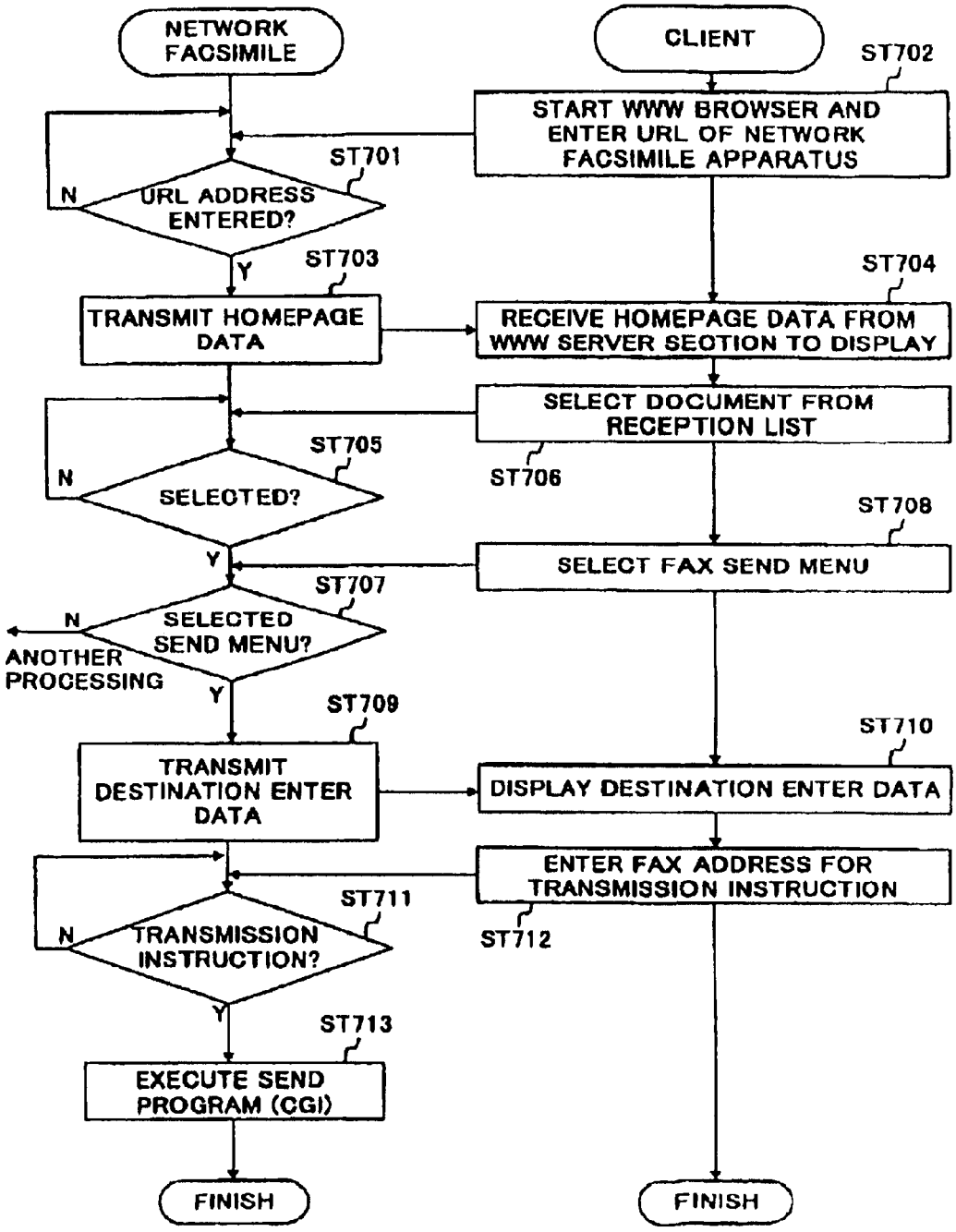
FIG. 9 is a flowchart to explain an operation for transmitting data stored at the network facsimile apparatus according to the above embodiment.

The case of transmitting data stored at the network facsimile apparatus is first described with a flowchart in FIG. 9. At ST701, the network facsimile apparatus is in a stand-by state until a homepage address (URL address) is entered. At ST702, the client machine connected to the network starts the WWW browser (homepage browsing software) and enters the URL address of the network facsimile apparatus to access to the homepage. At ST703, in the network facsimile that receives the access, WWW server section 12 initiates the processing through network control section 10, and transmits homepage data (HTML file) stored in external storage 4 to the WWW browser at the client machine. According to the aforementioned processing, at ST704, the homepage of the network facsimile is displayed at the client machine (601 in FIG. 8). At ST705 the network facsimile apparatus awaits until next selection is performed.

At ST706 to ST708, a user selects an object file on the page illustrated by 602 in FIG. 8, and pushes "send" button. At ST709, the network facsimile apparatus transmits a page for instructing transmission (not shown). At ST710, the page is displayed at the client machine. At ST711 to ST713, when the user designates a destination facsimile number or destination e-mail address to perform a transmission instruction, WWW server section 12, to which the transmission instruction is provided, starts a CGI program for transmission with a CGI interface and performs the transmission processing.

Figure 10:
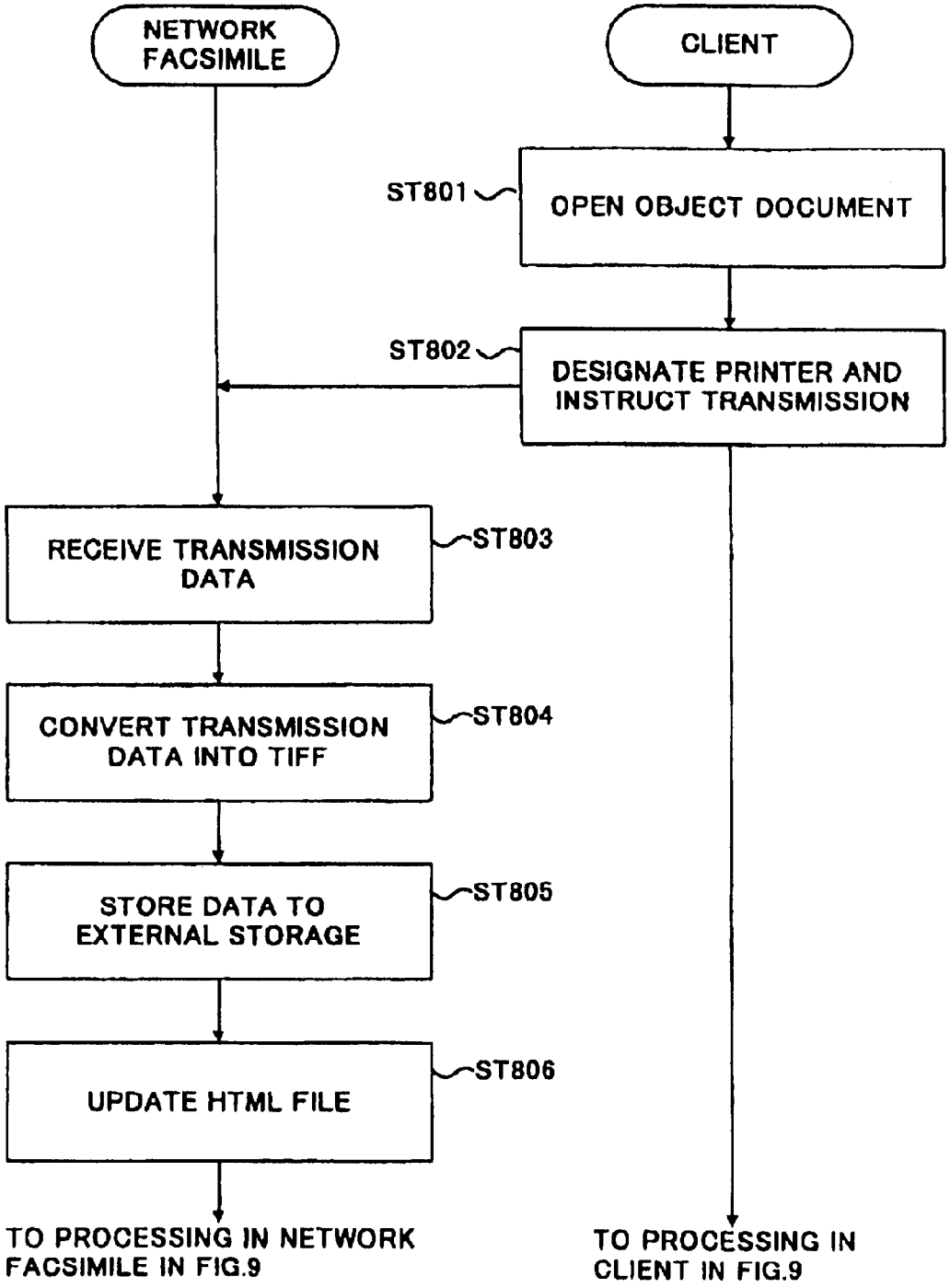
FIG. 10 is a flowchart to explain an operation for transmitting a document file of the client machine after storing the file at the network facsimile apparatus according to the above embodiment.

The next description illustrates the case where the network facsimile apparatus transmits a document file stored at client machine with reference to a flowchart in FIG. 10. At ST801 to ST802, a suer of the client machine opens an object document file using, for example word processor software, and designates the network facsimile as a printer and performs the same instruction as printing.

At ST803 to ST805, network control section 10 at the network facsimile apparatus receives transmission data from the client machine, instructs TIFF conversion section 14 to convert the data into TIFF format, provides a file name to the converted file and store the file at external storage 4. Further, network control section 10 notifies the HTML file generating section of the storage of the file.

At ST806, HTML file generating section that receives the notification adds the file information to a reception list table illustrated in FIG. 7, while updates the HTML file for displaying the file information on the browser.

As described above, the document file at the client machine is temporarily stored at the network facsimile apparatus. The network facsimile apparatus then transmits the temporarily stored data in the same way as transmitting the stored data illustrated in FIG. 9. In the case of only printing without transmitting, it is possible to transmit the data to printer 6 to print.

The above-description illustrates the case of storing transmission data temporarily at external storage 4 to transmit.

However, it may be possible for a user to enter a facsimile number or e-mail address when instructs printing so that the send program is started by the CGI interface immediately after the transmission data is converted into TIFF format in order to transmit the data.

The next description illustrates the operation in which a user performs the device setting of the network facsimile apparatus using the WWW browser at the client machine. The homepage of the network facsimile apparatus provides an enter page adapted to enter various device settings such as user setting and destination registration. A user of the client machine starts the WWW browser, accesses to the homepage of the network facsimile apparatus and displays the page for performing object device setting. For example, when the user opens the setting page concerning a send, designates a fine as a character size; and pushes "setting" button, WWW server section 12 executes the setting program linked to the "getting" button with the CGI interface to perform the setting of the network facsimile apparatus.

Figure 11:
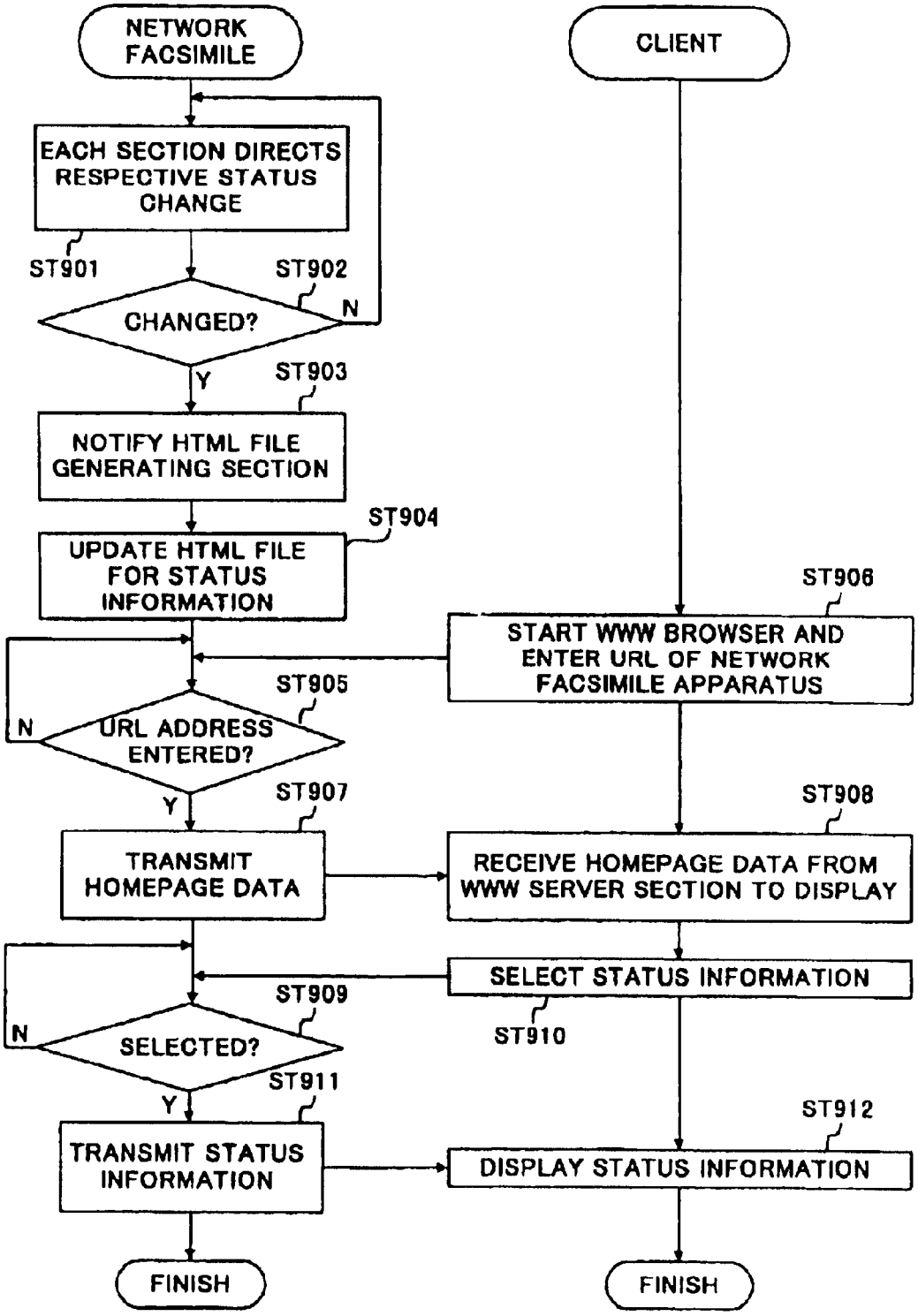
FIG. 11 is a flowchart to explain an operation for transmitting status information generated at the network facsimile apparatus according to the above embodiment to the client machine.

The next description illustrates the operation in which the network facsimile apparatus generates the device status in HTML file with reference to a flow chart in FIG. 11. At ST901, scanner 8, printer 6, panel section 7 and FAX/speech communication section 9 always directs changes of own respective status.

At ST902 to ST903, when a state change occurs, for example, paper is out of stock at printer 6, printer 6 notifies HTML file generating section 11 of change content.

At ST904, since HTML file generating section 11 holds in advance many HTML files to display status (device status) information and GIF files to display a status with a picture, HTML file generating section 11 updates the contents of HTML files and changes GIF files whenever a status changes.

When a user of the client machine refers to the status (device status) information, at ST905 to ST912, the user starts the WWW browser, displays a homepage of the network facsimile and selects respective status information on scanner 8, printer 6, panel section 7 and FAX/speech communication section 9 to display, which enables the user to know the latest device status at any time.

In addition, the network facsimile apparatus updates the content of HTML files and changes GIF files at the time a device status changes even though a user of the client machine is accessing to the homepage of the network facsimile, the user is able to know a device status at real time.

The present invention is not limited to the aforementioned operation. It may be possible to generate other information such as facsimile communication log and facsimile apparatus manual in HTML file in order to enable a user to read the information with the WWW browser.

The present invention is not limited to the above described embodiments, and various variations and modifications may be possible without departing from the scope of the present invention.

This application is based on the Japanese Patent Application No. HEI 10-274920 filed on Sep. 29, 1998, entire content of which is expressly incorporated by reference herein.

What is claimed is:

1. A communication apparatus including a printer and a scanner connected to a terminal apparatus via a network, the communication apparatus comprising:

a receiver that receives e-mail via the network;

a memory that stores the e-mail data received by said receiver;

a generator that generates a HTML file including management data corresponding to the stored e-mail data, the management data including sender data of the e-mail data;

a communicator that performs a HTTP protocol communication with the terminal apparatus to transmit the HTML file to the terminal apparatus when a request for the management data is received from the terminal apparatus, the management data in the HTML file being displayable at the terminal apparatus; and a controller that, in response to receipt of a designation of management data by the terminal apparatus, and in response to receipt of a command output by the terminal apparatus, controls a transmission of the stored e-mail data corresponding to the designated management data, to a destination, in accordance with the command, the destination being distinct from the terminal apparatus and from the printer.

2. The communication apparatus according to claim 1, wherein said memory stores a plurality of e-mail data, and said generator generates a list of management data.

3. The communication apparatus according to claim 1, wherein said memory stores a TIFF file attached to the e-mail data.

4. The communication apparatus according to claim 1, wherein the management data includes at least a time at which the e-mail data corresponding to the management data is stored in said memory.

5. The communication apparatus according to claim 1, wherein the sender data comprises an origination address.

6. The communication apparatus according to claim 1, wherein the terminal apparatus comprises a personal computer with a display.

7. The communication apparatus according to claim 1, wherein the scanner scans a document to obtain image data, said apparatus further comprising:

a compressor that compresses the image data; and a facsimile transmitter that transmits the compressed image data to a destination via a telephone network.

8. The communication apparatus according to claim 1, further comprising:

a facsimile receiver that receives facsimile data via a telephone network; and a converter that converts the received facsimile data into a TIFF file;

wherein said memory stores the TIFF file, and said generator generates management data corresponding to the TIFF file as a structured document.

9. The communication apparatus according to claim 8, further comprising a determining section that determines whether the data was received via the network or the telephone network.

10. The communication apparatus according to claim 1, wherein said generator assigns a specific number to each management data, the specific number being utilized to identify each management data.

11. The communication apparatus according to claim 1, further comprising:

a converter that converts the stored e-mail data into image data;

wherein the printer prints the converted image data; and wherein said controller controls printing of the converted e-mail data in accordance with the command from the terminal apparatus.

12. The communication apparatus according to claim 1, wherein the terminal apparatus displays command menu together with the management data.

13. The communication apparatus according to claim 12, wherein the terminal apparatus displays a plurality of commands including at least a transmission command and a printing command, the stored e-mail being controlled by selection of one of the commands.

14. The communication apparatus according to claim 1, wherein said memory is configured to store a plurality of e-mail data, the HTML file including management data for each of the plurality of stored e-mail data, and said communicator transmitting a selected one of said plurality of e-mail data to the terminal apparatus, in response to a designation of a corresponding management data.

15. The communication apparatus according to claim 1, the management data associating the HTML file with the stored e-mail data.

16. A communication method using a communication apparatus including a printer and a scanner connected to a terminal apparatus via a network, the method comprising:

receiving e-mail data via the network;

storing the received e-mail data into a memory;

generating a HTML file including management data corresponding to the stored e-mail data, the management data including sender data of the e-mail data;

performing a HTTP protocol communication with the terminal apparatus to transmit the HTML file to the terminal apparatus when a request for the management data is received from the terminal apparatus, the management data in the HTML file being displayable at the terminal apparatus;

controlling, in response to receipt of a designation of management data by the terminal apparatus and in response to receipt of a command output by the terminal apparatus, transmission of the stored e-mail data corresponding to the designated management data to a destination in accordance with the command, the destination being distinct from the terminal apparatus and from the printer.

17. The communication method according to claim 16, wherein the storage stores a plurality of e-mail data into the memory, and the generating generates a list of management data.

18. The communication method according to claim 16, wherein the storing stores a TIFF file attached to the e-mail data.

19. The communication method according to claim 16, wherein generating the HTML file including the management data includes generating at least a time at which the e-mail data corresponding to the management data is stored in the memory.

20. The communication method according to claim 16, wherein the sender data comprises an origination address.

21. The communication method according to claim 16, wherein the terminal apparatus comprises a personal computer with a display.

22. The communication method according to claim 16, further comprising:

scanning a document to obtain image data;

compressing the image data; and transmitting the compressed image data to a destination via a telephone network.

23. The communication method according to claim 16, further comprising:

receiving facsimile data via a telephone network; and converting the received facsimile data into a TIFF file;

wherein the TIFF file is stored into the memory, and management data corresponding to the TIFF file is generated as a structured document.

24. The communication method according to claim 23, further comprising determining whether the data is received via the network or via a telephone network.

25. The communication method according to claim 16, further comprising assigning a specific number to each management data, the specific number being utilized to identify each management data, the destination being distinct from the terminal apparatus and from the printer.

26. The communication method according to claim 16, further comprising:

converting the stored e-mail data into image data; and printing the converted image data;

wherein the converted e-mail data is printed in accordance with the command from the terminal apparatus.

27. The communication method according to claim 16, the management data associating the HTML file with the stored e-mail data.

28. A communication apparatus including a printer and a scanner connected to a terminal apparatus via a network, the communication apparatus comprising:

a receiver that receives e-mail data via the network;

a memory that stores the e-mail data received by said receiver;

a generator that generates a HTML file including management data corresponding to the stored e-mail data;

a communicator that performs a HTTP protocol communication with the terminal apparatus to transmit the HTML file to the terminal apparatus when a request for the management data is received from the terminal apparatus, the management data in the HTML file being displayable at the terminal apparatus; and a controller that, in response to receipt of a designation of management data by the terminal apparatus, and in response to receipt of a command output by the terminal apparatus, controls a transmission of the stored e-mail data corresponding to the designated management data, to a destination, in accordance with the command, the destination being distinct from the terminal apparatus and from the printer.

29. A communication method using a communication apparatus including a printer and a scanner connected to a terminal apparatus via a network, the method comprising:

receiving e-mail data via the network;

storing the received e-mail data into a memory;

generating a HTML file including management data corresponding to the stored e-mail data;

performing a HTTP protocol communication with the terminal apparatus to transmit the HTML file to the terminal apparatus when a request for the management data is received from the terminal apparatus, the management data in the HTML file being displayable at the terminal apparatus;

controlling, in response to receipt of a designation of management data by the terminal apparatus and in response to receipt of a command output by the terminal apparatus, transmission of the stored e-mail data corresponding to the designated management data to a destination in accordance with the command, the destination being distinct from the terminal apparatus and from the printer.

*30. A communication apparatus including a printing functionality, the communication apparatus being connected to a terminal apparatus via a network, the communication apparatus comprising:*

*a receiver configured to receive e-mail data via the network;*

*a memory configured to store the e-mail data received by said receiver;*

*a generator configured to generate a HTML file including management data related to the stored e-mail data, the management data including data regarding a sender of the e-mail data;*

*a communicator configured to perform a HTTP protocol communication with a terminal apparatus to transmit the HTML file to the terminal apparatus when a request for the management data is received from the terminal apparatus, the management data in the HTML file being displayable at the terminal apparatus;*

*a controller that, in response to receipt of a designation of management data and a command output by the terminal apparatus, being configured to control a transmission of the stored e-mail data corresponding to the designated management data, to a destination designated by a facsimile number or an e-mail address, in accordance with the command, the destination being distinct from the terminal apparatus and from the communication apparatus.*

*31. The communication apparatus according to claim 30, the HTML file comprising a predetermined page including a plurality of commands including at least a transmission command, a printing command, an editing command, and a deletion command.*

*32. The communication apparatus according to claim 30, the communicator being further configured to perform the HTTP protocol communication upon entry of a URL of the communication apparatus by the terminal apparatus.*

*33. The communication apparatus according to claim 30, the management data including time and date data for the stored e-mail data.*

*34. A communication method involving communication apparatus including a printing functionality, the communication apparatus being connected to a terminal apparatus via a network, the communication method comprising:*

*receiving e-mail data via the network;*

*storing the received e-mail data;*

*generating a HTML file including management data related to the stored e-mail data, the management data including data regarding a sender for the e-mail data;*

*performing a HTTP protocol communication with a terminal apparatus to transmit the HTML file to the terminal apparatus when a request for the management data is received from the terminal apparatus, the management data in the HTML file being displayable at the terminal apparatus;*

*controlling, in response to receipt of a designation of management data and a command output by the terminal apparatus, a transmission of the stored e-mail data corresponding to the designated management data, to a destination designated by a facsimile number or an e-mail address, in accordance with the command, the destination being distinct from the terminal apparatus and from the communication apparatus.*

*35. The communication method according to claim 34, the HTML file comprising a predetermined page including a plurality of commands including at least a transmission command, a printing command, an editing command, and a deletion command.*

*36. The communication method according to claim 34, the HTTP protocol communication being performed upon entry of a URL of the communication apparatus by the terminal apparatus.*

*37. The communication method according to claim 34, the management data including time and date data for the stored e-mail data.*

* * * * *